United States Statutory Invention Registration [19]

[11] Reg. Number: H964

Olson et al. [43] Published: Sep. 3, 1991

[54] APPARATUS FOR SENSING THE SPEED OF AN ELEMENT WITHIN A TORQUE CONVERTER

[75] Inventors: Martin D. Olson, Washington; Dwayne E. Arff, Peoria, both of Ill.

[73] Assignee: Caterpillar Inc.

[21] Appl. No.: 569,793

[22] Filed: Aug. 20, 1990

[51] Int. Cl.[5] ..... G01P 3/48; G01B 7/14

[52] U.S. Cl. ..... 324/174; 324/173; 324/207.13; 324/207.22; 324/207.25

[58] Field of Search ..... 324/174, 173, 207.13, 324/207.22, 207.25; 74/866; 475/51

[56] References Cited

U.S. PATENT DOCUMENTS

| | | | |
|---|---|---|---|
| 3,820,417 | 6/1974 | Allen et al. | 74/733 |
| 4,110,676 | 8/1978 | Edick et al. | 324/174 |
| 4,222,263 | 9/1980 | Armstrong | 73/116 |
| 4,257,040 | 3/1981 | Shirasaki et al. | 340/671 |
| 4,288,746 | 9/1981 | Singbartl | 324/174 |
| 4,355,364 | 10/1982 | Gudat | 364/565 |
| 4,521,731 | 6/1985 | Uyeda et al. | 324/174 |
| 4,586,401 | 5/1986 | Nogle | 324/174 |
| 4,612,501 | 9/1986 | Costello et al. | 324/208 |
| 4,653,458 | 3/1987 | Bergsten | 123/612 |

*Primary Examiner*—Linda J. Wallace
*Attorney, Agent, or Firm*—Charles E. Lanchantin, Jr.

[57] ABSTRACT

A vehicular drive train includes a torque converter having a bladed impeller element, a bladed turbine element, and a bladed reactor element defining a toroidal chamber within an engine-driven rotating housing. The impeller element is relatively inaccessible because it is contained within the rotating housing, yet it is desirable to monitor its speed in order to better control the operation of the drive train. A speed sensor apparatus is therefore provided which includes a ring magnet connected to rotate with the impeller element, a sensor unit connected to a stationary carrier assembly close to the ring magnet, an external electrical connector, and a wiring harness interconnecting the sensor unit and the electrical connector. Preferably, the sensor unit delivers two digital pulse signals to an associated microprocessor for precise control of the input clutch assembly. The ring magnet and the sensor unit are located radially inwardly of the toroidal chamber such that no additional space is required.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR SENSING THE SPEED OF AN ELEMENT WITHIN A TORQUE CONVERTER

DESCRIPTION

1. Technical Field

This invention relates generally to an apparatus for measuring the speed of rotation of an annular element located within a mechanism, and more particularly to a speed sensor apparatus of the Hall Effect type for generating signals corresponding to the rotational speed and direction of an element, such as a bladed element contained entrappingly within a hydrodynamic torque converter.

2. Background Art

Externally mounted speed sensors have been widely used to measure the rotational speed of an element disposed in the drive line of a vehicle. Exemplifying the art in this area are the following U.S. Pat. Nos.:

4,222,263 issued Sept. 16, 1980, to C. M. Armstrong.
4,288,746 issued Sept. 8, 1981, to G. Singbartl.
4,355,364 issued Oct. 19, 1982, to A. J. Gudat.
4,521,731 issued June 4, 1985, to T. Uyeda et al.
4,612,501 issued Sept. 16, 1986, to S. M. Costello et al.
4,653,458 issued Mar. 31, 1987 to L. Bergsten.

Many of such speed sensors have incorporated external teeth around the periphery of a relatively accessible rotating element and a cooperating stationary sensor assembly which has one or more internal magnets positioned in close proximity to the teeth. For the most part the operating conditions for these speed sensors have not been too severe so that the speed readings therefrom have been acceptable.

However, when a torque converter of the type disclosed in U.S. Pat. No. 3,820,417, issued June 28, 1974, to T. E. Allen et al., is considered to be desirable for work vehicle use, it can be appreciated that measuring the speed and direction of rotation of the partially disconnected impeller element becomes a more difficult problem. In that construction the bladed impeller element can rotate at a speed independent of the rotating input housing that generally surrounds it, and independent of the conjointly rotating turbine element and output shaft within it. In some instances both the speed and direction of rotation of the impeller element are desired in order to precisely monitor and control the slipping conditions of the interleaved plates and discs of the input clutch assembly connected between the rotating housing and the impeller element. In that construction it is undesirable to add a tubular extension to the body of the impeller element in order to obtain a more accessible external speed pick-up point, because it would add unnecessary size and cost to the drive line.

Accordingly, what is desired is a rugged speed sensor apparatus for measuring the rotational speed and the direction of rotation of a relatively entrenched or inaccessible element of a mechanism such as a hydrodynamic torque converter without increasing the physical size thereof. Such an apparatus should also be economical to produce, be relatively simple to install and be capable of producing electrical signals of sufficient strength under the hot oil and pressurized operating conditions within a torque converter to be fully dependable to the signal-receiving control system of the vehicle.

The present invention is directed to overcoming one or more of the problems as set forth above.

DISCLOSURE OF THE INVENTION

In one aspect of the invention, an internal speed sensor apparatus is provided for a mechanism including a carrier assembly, an annular element mounted on the carrier assembly for rotation about a central axis and having a radially inner portion defining an opening therethrough on the axis, a pair of end faces individually located at either side of the opening, a radially outer periphery, and a rotating housing mounted on the carrier assembly and entrapping the outer periphery and end faces of the element. The speed sensor apparatus desirably includes a ring magnet connected to rotate with the element, and a sensor unit connected to the carrier assembly in a juxtaposed relationship to the ring magnet and remote from an accessible exterior surface portion of the carrier assembly. The sensor unit and the ring magnet are located generally radially inwardly of the element, and define an electrical signal-generating device capable of generating at least one output signal related to the speed of rotation of the element.

In another aspect of the invention, a speed sensor apparatus is provided for a torque converter having a stationary carrier assembly disposed along a central axis and a bladed impeller element mounted on the carrier assembly for rotation about the central axis. A ring magnet is connected to rotate with the bladed impeller element, and a sensor unit is connected to the carrier assembly adjacent the ring magnet and remote from any external accessible location. Together, the ring magnet and the sensor unit define a Hall Effect signal-generating device located generally radially inwardly of the bladed impeller element for generating at least one signal related directly to the rotational speed of the bladed element.

More specifically, the present invention features a speed sensor apparatus having an internally located and juxtaposed sensor unit and a ring magnet capable of generating at least one electrical output signal related to the speed of an element generally entrapped within the mechanism. The instant speed sensor apparatus does not require tubular extensions or external teeth on the rotating element to be measured, and thus is compact and economical to produce. Moreover, it is rugged and can provide one or more strong electrical output signals even when exposed to the hot and pressurized oil conditions such as are experienced within a mechanism such as a hydrodynamic torque converter.

BEST MODE FOR CARRYING OUT THE INVENTION

Figure 1:
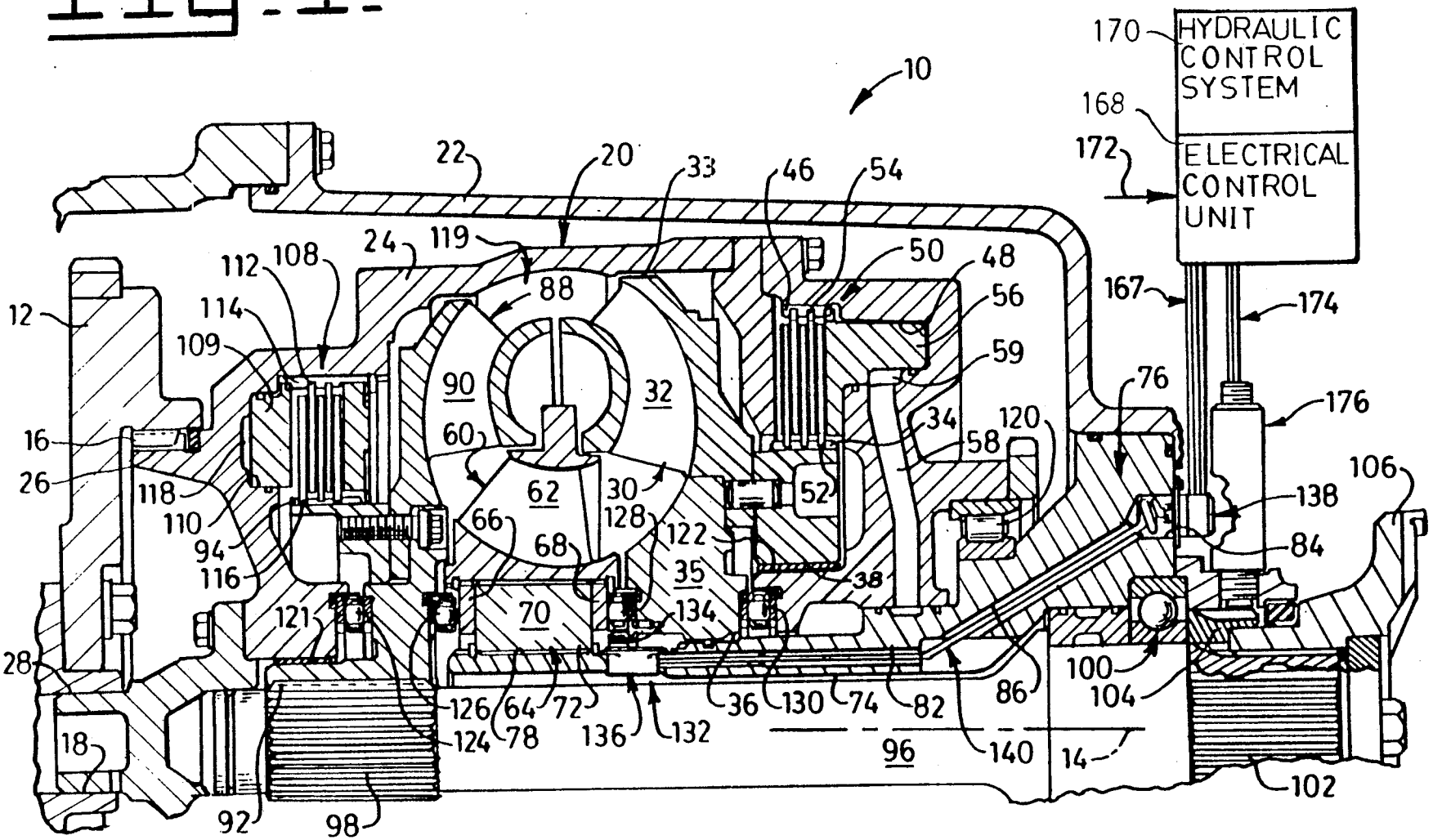
FIG. 1 is a fragmentary cross sectional view through the central axis of a torque converter incorporating the speed sensor apparatus of the present invention.

A vehicular drive train 10 is shown in FIG. 1 as including an engine-driven flywheel member 12 supported for rotation about a central axis 14 by the engine crankshaft bearings in the usual manner, although not illustrated. The flywheel member has an internal ring gear 16 and a cylindrical bore 18 concentrically disposed along the axis, and is adapted to powerably drive a hydrodynamic torque converter 20 located within an encircling stationary housing 22. The torque converter includes a rotating housing 24 having an external ring gear 26 intermeshingly engaged with the flywheel ring gear 16, and a forwardly located cylindrical extension 28 pilotably received in the bore 18.

The torque converter 20 includes a bladed impeller element 30 having a plurality of impeller blades 32 disposed in substantially equal spaced relationship around a generally cylindrical outer periphery 33 thereof, and a plurality of external teeth or splines 34 around the rear periphery thereof. A radially inner portion 35 of the impeller element has a stepped bore 36 therein, and a sleeve bearing 38 is positively seated within the enlarged rear portion of the stepped bore in a concentric relationship with the central axis 14. The inner portion 35 defines inlet and outlet passages, not shown, for the ingress of fluid to and the egress of fluid from the toroidal circuit of the torque converter, and forwardly facing and rearwardly facing thrust surfaces or end faces 42 and 44 located generally at either end of the smaller front portion of the stepped bore 36.

The rotating housing 24 has a plurality of internal teeth or splines 46 at the rear thereof and an annular, forwardly facing, piston-receiving cavity 48 thereat, and an input clutch assembly 50 is associated therewith to selectively drive the impeller element 30 at the desired speed rate relative to the rotating housing. More specifically, the input clutch assembly 50 includes a plurality of annular clutch discs 52 having suitably grooved facing material secured to the opposite sides thereof in the usual way, and a plurality of relatively smooth clutch plates 54 interleaved therewith. The clutch plates 54 are intermeshingly engaged with the internal teeth 46 of the rotating housing, and the clutch discs 52 are intermeshingly engaged with the external teeth 34 of the impeller element 30. Furthermore, the input clutch assembly 50 includes an annular actuating piston 56 received in the cavity 48 and, in use, adapted to be axially moved to controllably engage the clutch discs and plates together by fluid pressure in an inlet passage 58 defined through the rotating housing 24, and an annular chamber 59 formed behind the piston.

The torque converter 20 also includes a bladed reactor element 60 having a plurality of reactor blades 62 and an internal ring assembly 64 conjointly secured thereto. The ring assembly defines forwardly and rearwardly facing thrust plates 66 and 68, and includes a solid reactor ring 70 having an internal spline 72.

Figure 2:
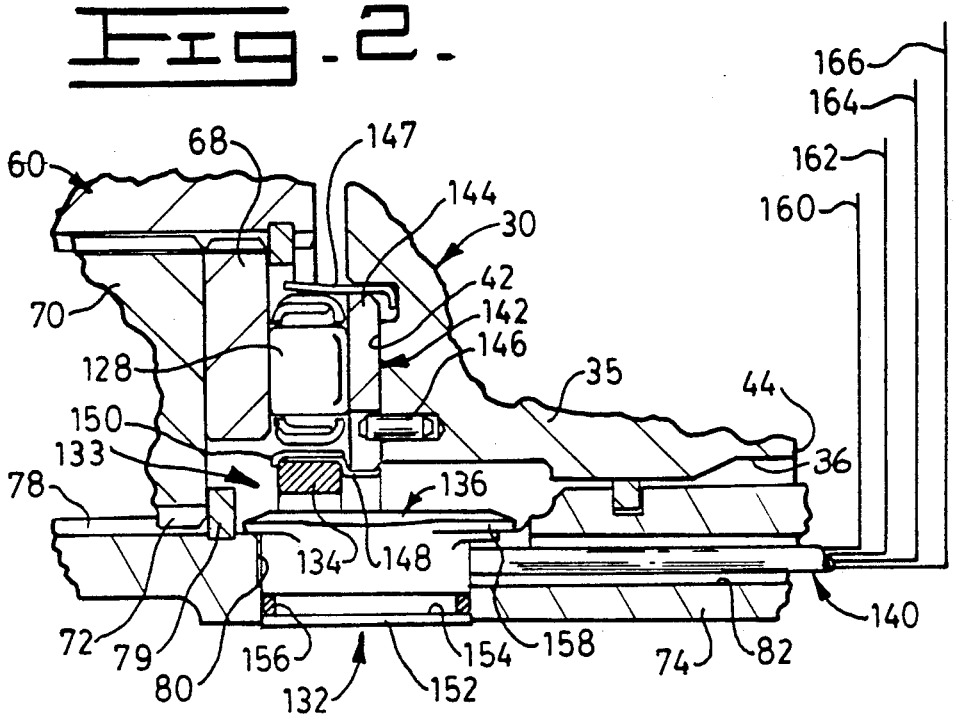
FIG. 2 is a fragmentary enlargement of FIG. 1 illustrating in greater detail a substantial portion of the speed sensor apparatus.

The reactor ring 70 and reactor element 60 are supported by a tubular support member 74 of a stationary carrier assembly 76 connected to the housing 22. An external spline 78 is defined at the forward end of the tubular support member, and the internal spline 72 of the reactor ring 70 is intermeshingly engaged therewith. As shown in FIG. 2, a snap ring 79 transfers rearward thrust loads to the tubular support member, and a similar snap ring at the front face of the reactor ring 70 transfers forward thrust loads thereto. The tubular support member 74 has a radially oriented cylindrical bore 80 therethrough, and an axially arranged passage 82 in communication with that bore, while as shown in FIG. 1 the rear portion of the carrier assembly 76 has a rearwardly outwardly facing pocket 84 and an obliquely disposed passage 86 opening on the pocket and extending into an aligned or intersecting relationship with the passage 82.

Furthermore, the torque converter 20 includes a bladed turbine element 88 having a plurality of turbine blades 90, an internal spline 92, and a plurality of external teeth 94 around the front end thereof. An elongate output shaft 96 has an external spline 98 at the front end thereof that is engaged with the internal spline 92 so that the shaft and turbine element are conjointly rotatable. At the rear end thereof the shaft 96 is rotatably supported in the carrier assembly 76 by a ball bearing assembly 100, and is provided with an external spline 102 so that a toothed speed pick-up ring 104 and an output flange 106 can be removably and conjointly secured thereto. In use, the rear flange 106 is serially coupled to a conventional multi-clutch-type transmission, not shown, for operating the vehicle in a plurality of forward speeds and at least one reverse speed.

In the present embodiment a lock-up clutch assembly 108 is incorporated between the input rotating housing 24 and the turbine element 88. The lock-up clutch assembly includes an annular actuating piston 109 received in a rearwardly facing cavity 110 of the rotating housing, a plurality of clutch plates 112 intermeshingly engaged with an internal spline 114 formed in the rotating housing, and a plurality of clutch discs 116 intermeshingly engaged with the external teeth 94 of the turbine element 88. When pressure is supplied to a chamber 118 behind the piston 109, the lock-up clutch assembly 108 is engaged and the output shaft 96 is conjointly rotatable with the input rotating housing 24 for a direct drive or mechanical mode of operation. When it is not engaged, the torque converter 20 operates in a mode wherein torque is transmitted through an operating fluid circulating between the impeller blades 32, the turbine blades 90, and the reactor or stator blades 62 in a toroidal chamber identified generally by the reference number 119.

The front portion of the rotating housing 24 is supported by the flywheel member 12 as stated generally earlier, while the rear portion of the rotating housing is supported on the stationary carrier assembly 76 by a roller bearing assembly 120. The turbine element 88 is rotationally supported within the rotating housing 24 by a sleeve bearing 121, and the impeller element 30 is stabilizingly supported by the sleeve bearing 38 seated on a cylindrical surface 122 of the rotating housing. Moreover, first, second, third and fourth roller thrust bearings 124,126,128 and 130 respectively are utilized to axially position the rotating housing, the turbine element 88, and the impeller or pump element 30 relative to the thrust plates 66 and 68 indirectly secured to the tubular support member 74 in an axial thrust-transmitting relationship.

As is shown in FIGS. 1 and 2 and in accordance with the present invention, a speed sensor apparatus 132 is associated with the torque converter 20 to monitor at least the rotational speed, and preferably also the direction of rotation of the internally confined impeller element 30. The speed sensor apparatus 132 includes an electrical signal-generating device 133 consisting primarily of a ring magnet 134 connected to rotate with the impeller element 30, and a sensor unit 136 seated within and extending radially outwardly from the bore 80 of the tubular support member 74. The speed sensor apparatus further includes an external electrical connector 138 securely mounted on the carrier assembly 76 at the pocket 84, and coupling means such as a wiring harness 140 for electrically connecting the sensor unit 136 and the electrical connector 138. The ring magnet 134 is a preferably solid annular body having an integrally formed and equally circumferentially spaced plurality of alternating north and south poles, for example 24 north poles and 24 south poles. As is shown best in FIG. 2, the ring magnet 134 is advantageously part of a bearing assembly 142 including the third thrust bearing 128, a thrust plate 144 seated against the thrust surface 42 and conjointly secured to the inner portion 35 of the impeller element 30 as by a conventional dowel or locking pin 146, and a containment sleeve 147 secured to the periphery of the thrust plate. The bearing assembly also includes an inner cup or radially outwardly facing troughed member 148 and an outer cup or radially inwardly facing troughed member 150 that are annularly interconnected for securing the ring magnet 134 to the inner periphery of the thrust plate 144 in a relatively precise location.

The sensor unit 136 has a generally cylindrically shaped body 152 with an annular groove 154 disposed therein, and an elastomeric o-ring 156 is seated in the groove to help secure the sensor unit firmly in the cylindrical bore 80 of the tubular support member 74. A flat deck and alignment tab 158 are formed on the sensor unit radially outwardly of the body, and a plurality of electrical components are contained within the sensor unit such as juxtaposed first and second Hall sensors, not shown. Although such generally referenced electrical components are not shown in the drawings, the sensor unit 136 and the ring magnet 134 are of the type commercially offered by The Torrington Company of 59 Field Street, Torrington, Conn. 06790.

The wiring harness 140 extending from the sensor unit 136 to the electrical connector 138 includes first, second, third and fourth electrical lines 160, 162 164 and 166 as is diagrammatically illustrated in FIG. 2 which respectively correspond to an electrical power source line at a preselected voltage, an electrical ground line, and first and second signal lines. The electrical connector 138 couples these lines to a suitable microprocessor or electrical control unit 168 as is schematically shown in FIG. 1 by another wiring harness 167. In turn, the electrical control unit 168 is connected to an electrically actuated hydraulic control system 170 for controllably directing pressurized hydraulic fluid to the piston actuating chamber 59 of the torque converter 20 for torque output to the downstream multi-speed transmission, not shown, for the desired operation of the vehicle.

In addition to the speed sensor apparatus 132, the microprocessor 168 also receives an engine speed signal which is representative of the speed of rotation of the rotating housing 24 at a signal line 172 in a conventional manner, and a torque converter output speed signal at another signal line 174 leading from a variable reluctance magnetic speed pick-up 176. The externally located speed pick-up 176 is operatively associated with the accessible toothed ring 104 and thereby provides a signal proportional to the rotational speed of the turbine element 88 or the output shaft 96 in the usual manner.

Industrial Applicability

In operation, the input clutch assembly 50 has a primary function of being the last element of the vehicular drive train 10 to be engaged during shifts of the downstream transmission so as to better absorb transient energy peaks within the torque converter 20. For example, the input clutch assembly is automatically disengaged by the microprocessor 168 and the control system 170 during each shift of the transmission by relieving pressure in the actuating chamber 59, and is controllably reengaged sequentially after the selected transmission clutches are at least partially engaged by controllably repressurizing that chamber, although such well-known transmission clutches are not illustrated. This permits more rapid pressurization of the transmission clutches since they are no longer required to absorb the full load of a shift. This also reduces the design requirements of the transmission.

The lock-up clutch assembly 108 is engaged by the control system 170 directing pressurized fluid to the piston chamber 118. This couples the rotating housing 24 of the torque converter 20 to the turbine element 88 and the output shaft 96, so that the output shaft is directly mechanically driven by the engine or power plant of the drive train 10. This provides additional efficiency in the drive train by minimizing hydraulic losses within the torque converter, and is normally utilized at the higher speed ranges of the associated transmission. In the low speed ranges of the output shaft 96 the engagement of the lock-up clutch assembly 108 is normally automatically prevented by the microprocessor 168.

Figure 3:
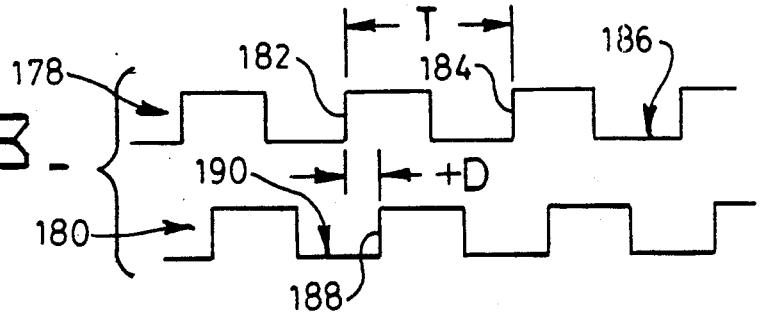
FIG. 3 is graphic drawing of the output signals from the speed sensor apparatus of FIGS. 1 and 2 as a function of a given time period, and illustrative of a first direction of rotation of a bladed element within the torque converter.

It can be appreciated that it is important to closely control the engagement of the input clutch assembly 50. In an extremely desirable manner, relatively strong or positively defined digital pulse signals are provided to the microprocessor 168 by the Hall sensors within the speed sensor unit 136. In this regard, reference is now made to FIG. 3 showing a first digital signal 178 and a second digital signal 180 obtained at the first and second signal lines 164 and 166 respectively when the impeller element 30 is rotating at a first rate of speed and in a first direction. The microprocessor 168 employs internal high-speed circuitry in the usual manner to measure the length of time T between a leading edge 182 and the next leading edge 184 of an individual cycle 190 of the first digital signal 178. The microprocessor also employs logic circuitry to measure the time length between the leading edge 188 of a cycle 190 of the second digital signal 180 and the leading edge 182 of the first digital signal 178 as is representatively indicated by the letter D accompanied by a plus sign in FIG. 3.

Figure 4:
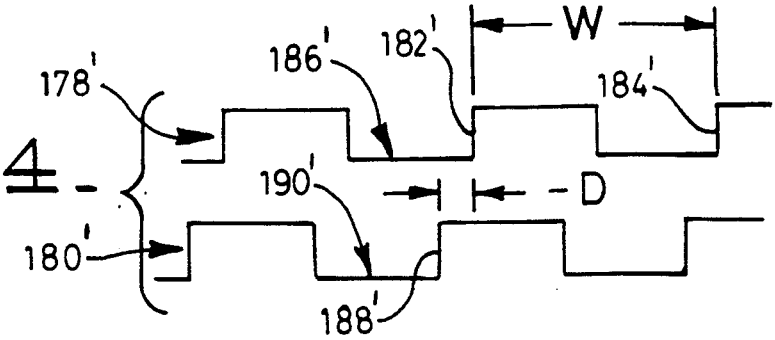
FIG. 4 is a schematic drawing of the output signals from the speed sensor apparatus similar to FIG. 3 illustrative of a slower speed of rotation of the bladed element and a direction of rotation opposite the first direction.

Referring next to FIG. 4, the first digital signal 178' shows a cycle 186' of a relatively greater width W illustrative of the impeller wheel 30 rotating at a slower rate of speed than the signal 178 of FIG. 3 as can be noted by comparing the cycle width T to the cycle width W. FIG. 4 further illustrates that the leading edge 188' of the second digital signal 180' is ahead of leading edge 182' of the first digital signal 178', rather than behind it as is represented by the negative sign accompanying the letter D. Thus, the relative sign of the letter or distance D in FIG. 4 is different indicating that the direction of rotation of the impeller element 30 is reversed from that shown in FIG. 3.

Thus it can be appreciated that the ring magnet 134 and the sensor unit 136 collectively define a digital type Hall Effect device 133 capable of generating at least one and preferably two output signals 178 and 180 that are continuously read by the microprocessor 168. A single signal can allow the microprocessor to obtain data corresponding to the rotational speed and rate of change of the speed of the impeller element 30, while two signals can allow a comparison therebetween and data on the direction of rotation of the impeller element. Advantageously, the ring magnet is part of the bearing assembly 142 located radially inwardly of the toroidal chamber 119 of the torque converter 20, or generally radially between the central axis 14 and the toroidal chamber. Since the ring magnet 134 is positively connected to the thrust plate 144 by the cups 148 and 150, and the thrust plate 144 is precisely secured to the inner portion 35 of the impeller element 30, the radial clearance from the sensor unit 136 is maintained within a relatively tight range and such greater concentricity with the central axis results in more consistent and higher level output signals.

It is further contemplated that the input clutch assembly 50 can be infinitely modulated by the vehicle operator through a suitable manual input device communicating with the microprocessor, although not shown. In this way the pressure of the fluid directed to the piston chamber 59 by the electrically actuated hydraulic control system 170 can be controllably reduced to allow the discs 52 and the plates 54 of the input clutch assembly to slip relative to each other so that less power is directed to the output shaft 96, and more power could be directed to any auxiliary equipment on the vehicle.

Other aspects, objects and advantages of this invention can be obtained from a study of the drawings, the disclosure and the appended claims.

We claim:

1. An internal speed sensor apparatus for a mechanism including a carrier assembly, an element mounted on the carrier assembly for rotation about a central axis and having a radially inner portion defining an opening therethrough oriented along the axis, a pair of end faces individually located at either side of the opening, a radially outer periphery, and a rotating housing mounted at least in part on the carrier assembly in a generally encasing relationship to the outer periphery and end faces of the element, comprising:

a ring magnet connected to rotate with the element;

a sensor unit connected to the carrier assembly in juxtaposed proximity to the ring magnet and remote from any exterior surface portion of the carrier assembly; and wherein the ring magnet and the sensor unit collectively define an electrical signal-generating device for generating at least one output signal related directly to the speed of rotation of the element, the ring magnet and the sensor unit being located generally radially inwardly of the element.

2. The speed sensor apparatus of claim 1 including an external electrical control unit and coupling means for electrically connecting the sensor unit to the electrical control unit.

3. The speed sensor apparatus of claim 2 wherein the sensor unit has first and second Hall sensors therein, and the coupling means includes a wiring harness having a power source line, a ground line, and first and second signal lines connected to the first and second Hall sensors respectively.

4. The speed sensor apparatus of claim 2 wherein the mechanism is a hydrodynamic torque converter, the element is a bladed impeller element of the torque converter, and the electrical signal-generating device is a Hall Effect device for generating two output signals related directly to the speed of rotation and the direction of rotation of the bladed impeller element.

5. The speed sensor apparatus of claim 4 wherein the torque converter has an input clutch assembly between the rotating housing and the bladed impeller element for controllably varying the speed of rotation of the impeller element.

6. The speed sensor apparatus of claim 5 wherein the torque converter has a bearing assembly defining a thrust plate secured to the bladed impeller element, and the ring magnet is connected to the thrust plate for controlled concentricity to the central axis and to the sensor unit.

* * * * *